(12) United States Patent
Degelman et al.

(10) Patent No.: US 6,546,707 B2
(45) Date of Patent: Apr. 15, 2003

(54) DOUBLE DECK ROTARY MOWER BODY

(75) Inventors: Scott Degelman, Regina (CA); Victor Labar, Regina (CA)

(73) Assignee: Degelman Industries Ltd., Regina (CA)

( * ) Notice: Subject to any disclaimer, the term of this patent is extended or adjusted under 35 U.S.C. 154(b) by 0 days.

(21) Appl. No.: 09/883,738

(22) Filed: Jun. 18, 2001

(65) Prior Publication Data

US 2002/0189223 A1 Dec. 19, 2002

(51) Int. Cl.⁷ .................................................. A01D 34/66
(52) U.S. Cl. ........................................................ 56/15.2
(58) Field of Search .............................. 56/320.1, 320.2, 56/15.8, 15.1, 15.2, 17.1, 16.7, 17.2, 17.5, DIG. 20; 188/19.1, 19.3

(56) References Cited

U.S. PATENT DOCUMENTS

| | | | | |
|---|---|---|---|---|
| 4,930,298 A | * | 6/1990 | Zenner ........................ 56/17.4 |
| 5,031,389 A | * | 7/1991 | Yawn et al. .................. 56/13.6 |
| 5,203,150 A | * | 4/1993 | Ryken et al. ................. 56/13.5 |
| 5,657,620 A | * | 8/1997 | Thagard et al. .............. 56/15.2 |
| 5,816,035 A | * | 10/1998 | Schick ........................ 56/15.2 |

* cited by examiner

Primary Examiner—Robert E. Pezzuto
(74) Attorney, Agent, or Firm—Davis & Bujold, P.L.L.C.

(57) ABSTRACT

A rotary mower for cutting vegetation including grass, brush and the like, and more particularly to a rotary ditch mower having a main body and extension wings or side sections supporting a number of cutting blades. The main body and extension wings are supported by contour following ground wheels and the main body also foldably supports the extension wings which may be inclined relative to the main body. The mower is also provided with a hitch pole for pull behind connection with a tractor and an articulation mechanism of the main body and extension wings for adjustment of cutting height over varying terrain during cutting operations as well as for raising the extension wings to a transport position and for raising the mower to a substantially vertical position, i.e., the main body and extension wings raised perpendicular with respect to the ground to facilitate servicing and maintenance of the mower.

12 Claims, 14 Drawing Sheets

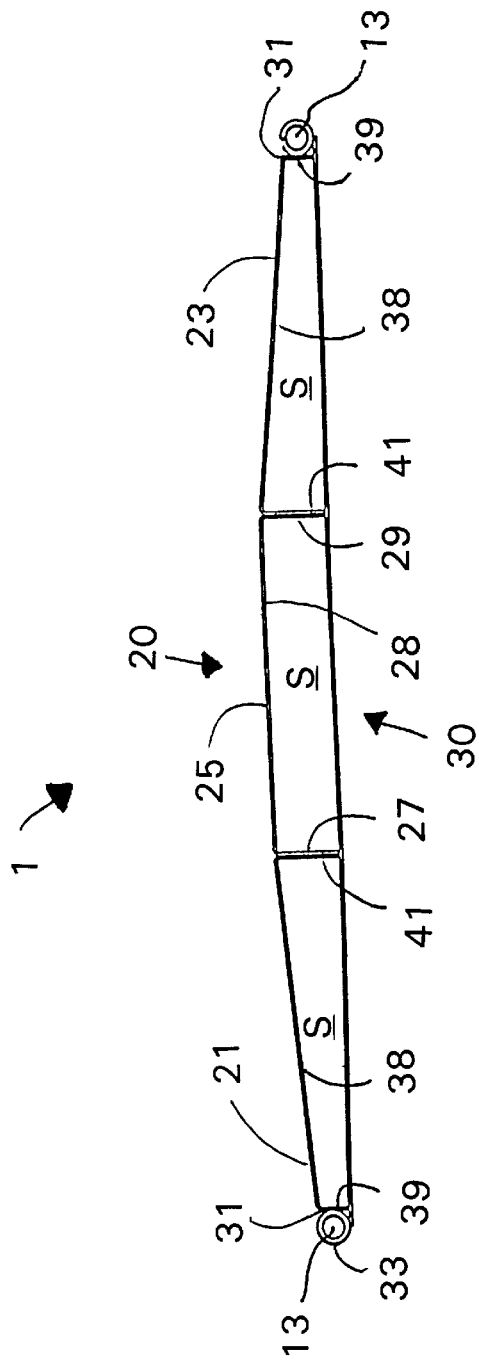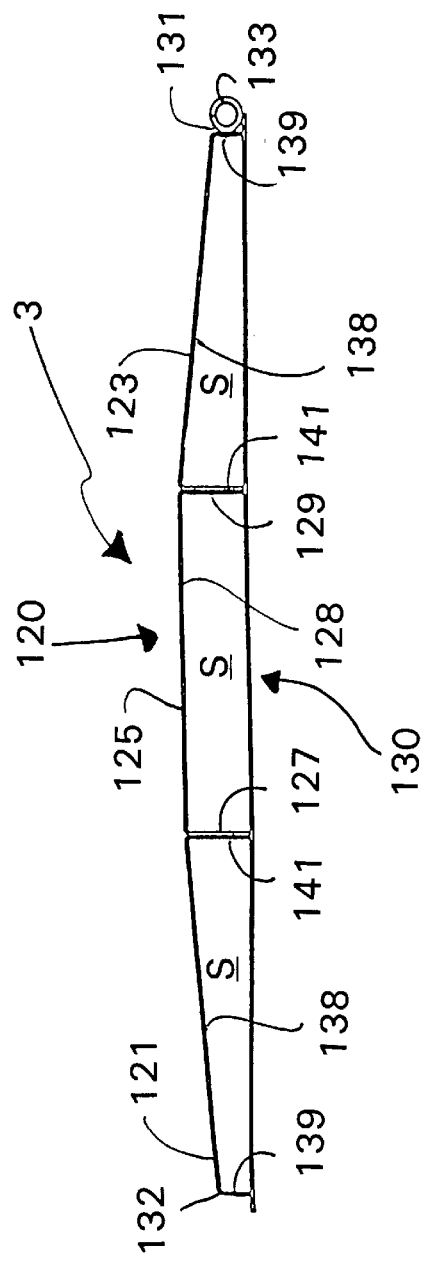

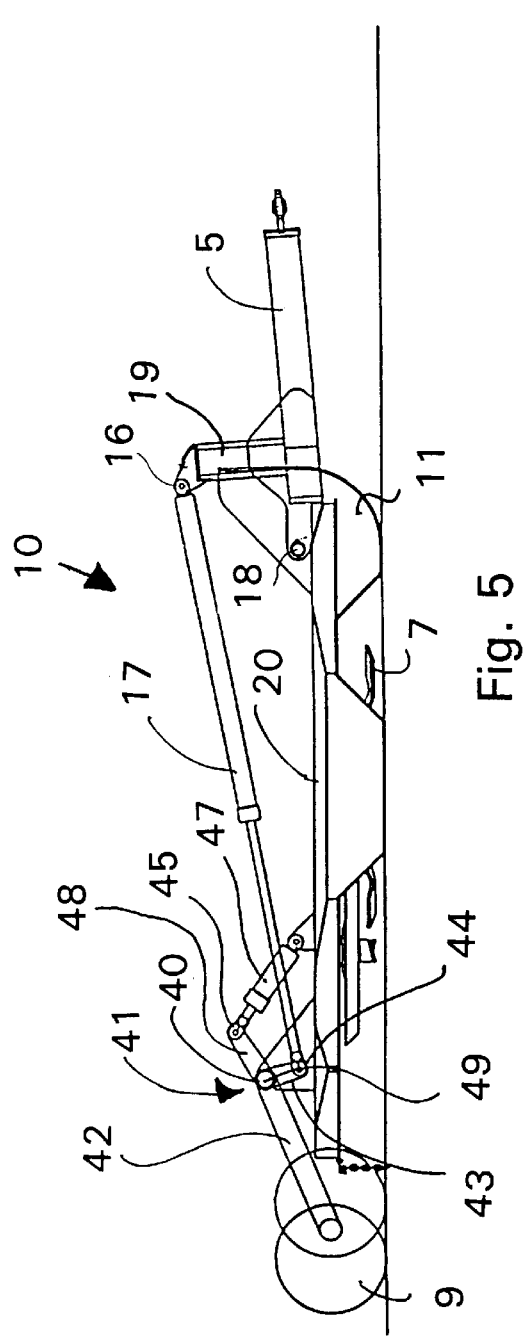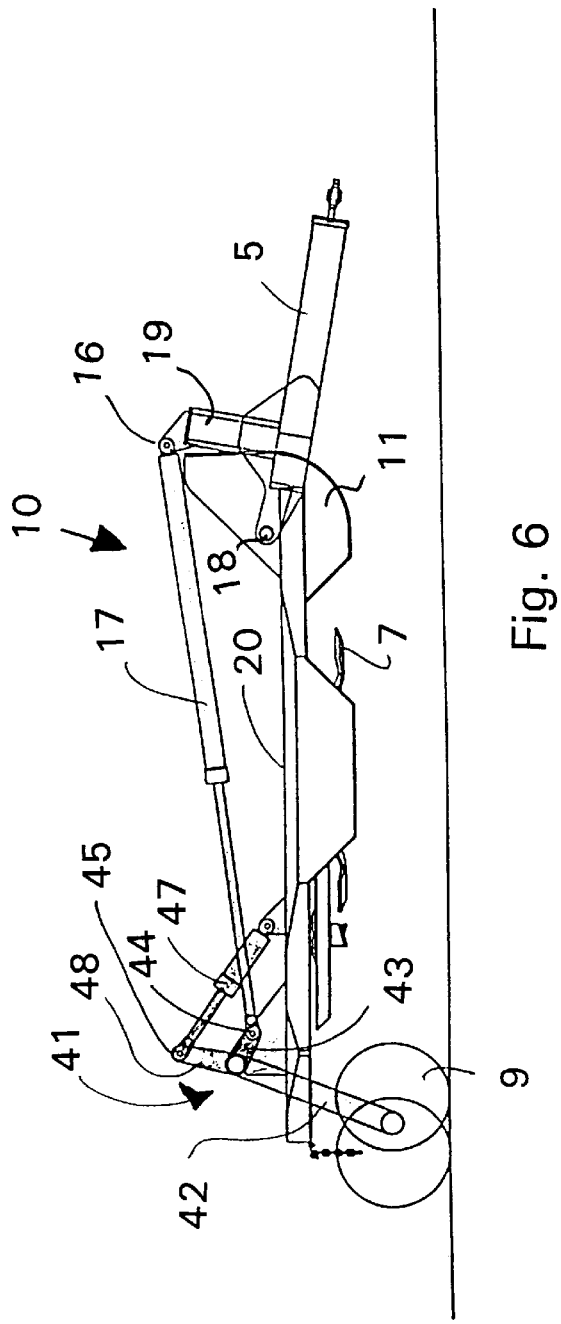

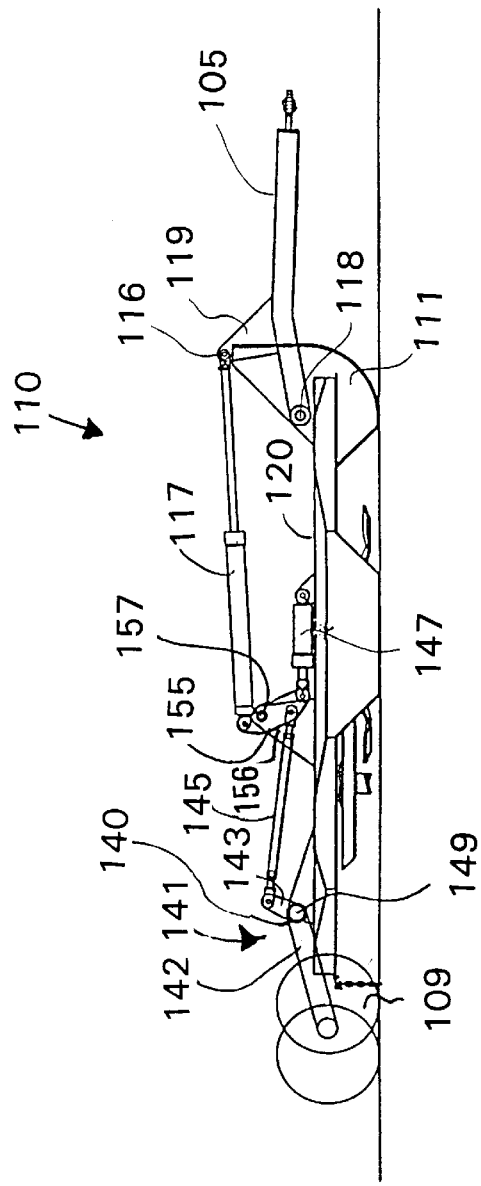
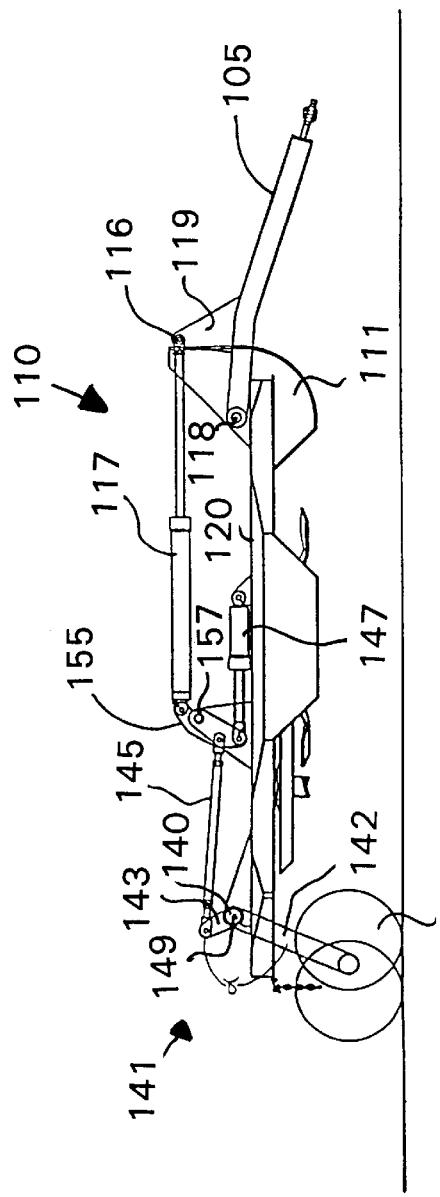
Fig. 9
Fig. 10

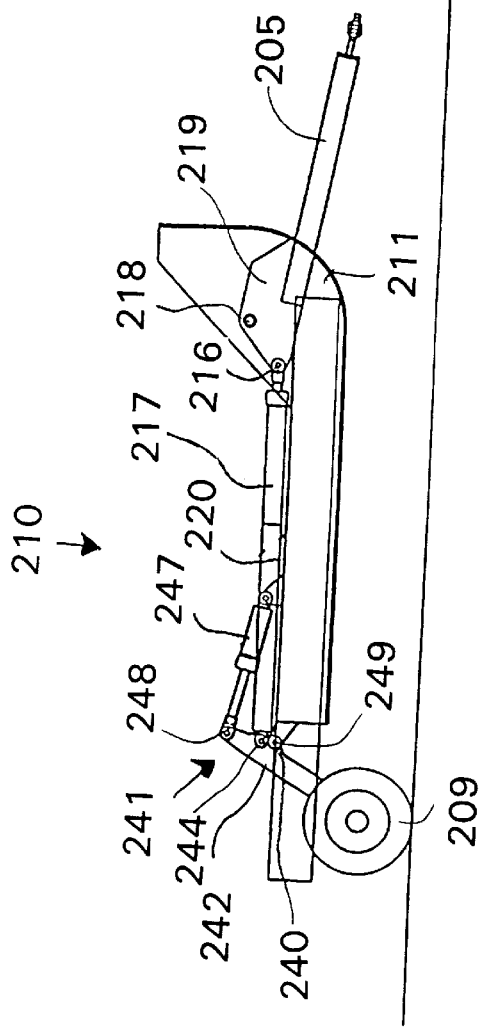
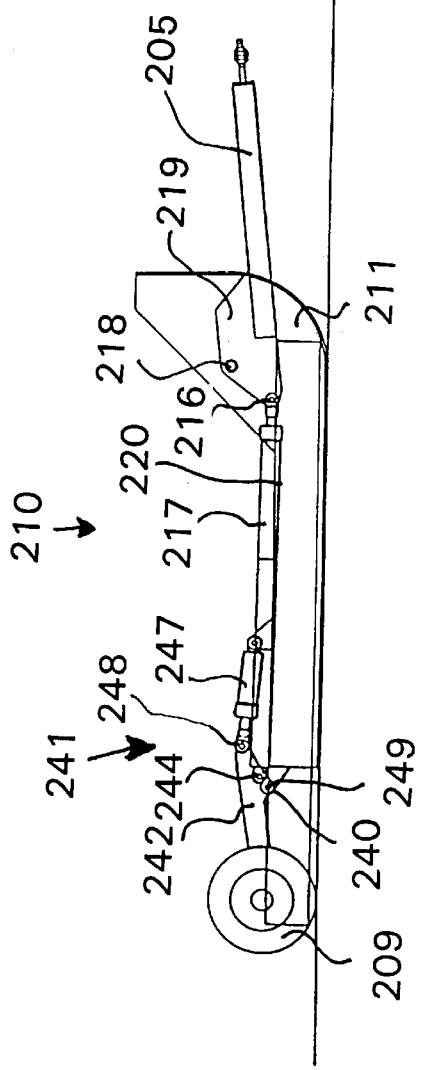

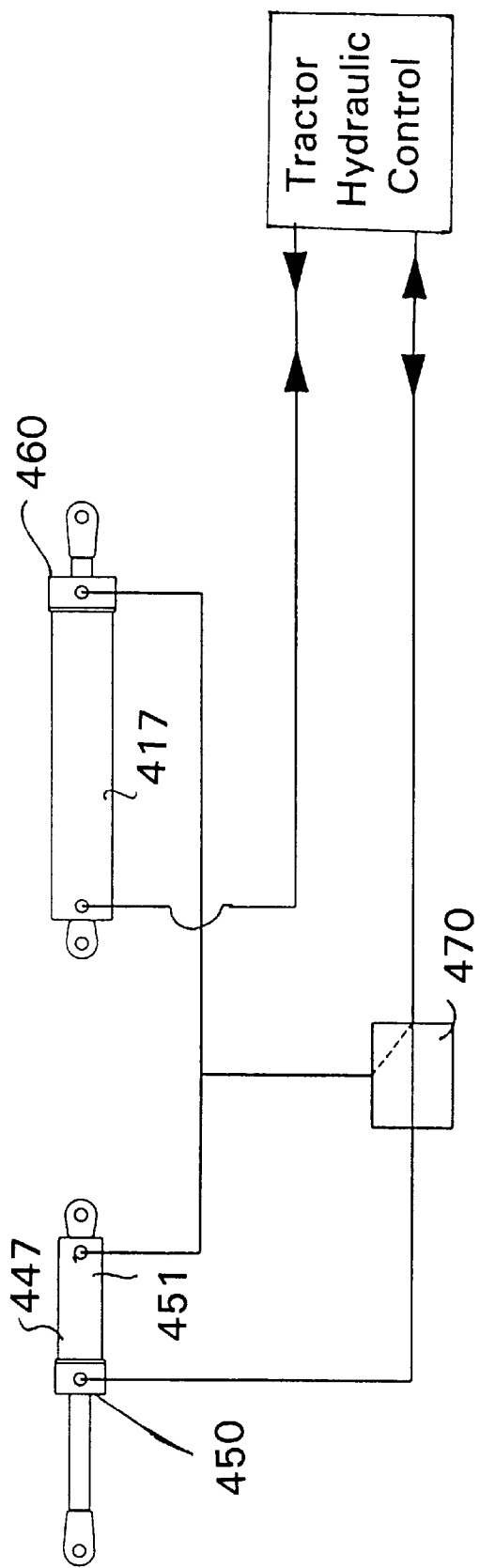

DOUBLE DECK ROTARY MOWER BODY

FIELD OF THE INVENTION

The present invention relates to rotary mowers for cutting vegetation including grass, brush and the like, and more particularly to a rotary ditch mower having a main body and extension wings or side sections supporting a number of cutting blades. The main body and extension wings are supported by contour following ground wheels and the main body also foldably supports the extension wings which may be inclined relative to the main body. The mower is also provided with a hitch pole for pull behind connection with a tractor and an articulation mechanism of the main body and extension wings for adjustment of cutting height over varying terrain during cutting operations as well as for raising the extension wings to a transport position and for raising the mower to a substantially vertical position, i.e., the main body and extension wings raised perpendicular with respect to the ground to facilitate servicing and maintenance of the mower.

BACKGROUND OF THE INVENTION

Pull behind rotary mowers can be generally classified into two types, finishing mowers and ditch mowers. A finishing mower, has separate distinct cutting sections with each section having ground contouring wheels. A top frame couples all of the panels together and controls cutting height and transportation.

These mowers are typically used on golf courses. The second class of mower, called a rotary cutter or ditch mower, is a unibody construction with the panels joined to the main center section by long hinges. The frame to control transportation and cutting height is typically incorporated into the cutting panels.

Rotary mowers for cutting vegetation in ditches are usually comprised of three five-foot wide panels supported by ground wheels that follow the contours of the ditch. The frame is made up of a linkage that keeps the mower parallel with the ground. Mowers travel at slow speeds (two to three mph) and, cut close to the ground with hardened steel blades rotating at speeds of up to and around 180 mph. They are designed to cut through debris-laden ditches and have long operating hours resulting in high maintenance requirements. One common problem is changing blades or making repairs to the center section where it is necessary to crawl underneath. The wing blades and wing panels however can usually be easily repaired as the wings fold up vertically. Priefert, U.S. Pat. No. 4,858,417 discloses a mower with adjustable extension wings and teaches how to perform a center section rotation to a vertical maintenance position through a complicated sequence of manual unlocking and locking mechanical procedures. Therefore it is imperative that the mowers be designed with as simple and maintenance free a mechanical operating system as functionally possible.

Rotary mowers must be generally serviced with each use. All U-joints, pivot pins and wear points are greased, and debris that collects on the top deck is brushed off on a daily basis. Cleaning is a common problem due to the volume of debris that collects on the top deck and clippings on the lower deck. Mower construction generally consists of a flat sheet of steel with hollow structural members (structural tubing) welded to it for rigidity. The pockets and corners created by this typical mower construction not only make it difficult to clean, but they collect water that causes rusting. Previous mower deck designs have strength and moments of inertia which vary dramatically. Areas are strong where there is a structural tube welded to the deck and areas in between the tubing are very weak, as strength is determined by the deck thickness alone. Some previous mower decks disclose a double deck design that reduces water pooling and debris. However these double deck designs consist of a flat bottom sheet and a sloped top sheet welded to structural tubing frame.

OBJECT AND SUMMARY OF THE INVENTION

The present invention relates to a mower having a simple mechanical system for rotating the center section substantially to a vertical position to allow the operator to safely change blades, make repairs, clean debris and inspect the center section. The linkage and mechanics of the present invention are simple and cost effective. Not only does one set of hydraulic cylinders act as a solid link bar in a parallel linkage design, but also the same set of hydraulic cylinders when actuated will fold the mower forward into a vertical position to substantially expose the center section underside. This system has a minimum number of linkage pivot points to limit the potential repair areas. The present invention also relates to a variety of similar linkages that will produce the same net result. The present invention also shows a method of incorporating "roll up skid pads" into a linkage member.

A second improvement consists of a two tiered top and bottom deck. The top deck consists of "U" shaped panels that when assembled together with a flat bottom deck make up a contoured unibody frame having a contoured or tapered top deck. The top and bottom deck when assembled together are separated by support members of the "U" shaped panels creating a unibody type frame having spaces defined between the top and bottom decks and a high strength to weight ratio. Damage to the deck from rocks, stumps or other flying debris is thus limited to the bottom or lower deck. This allows the top or upper deck to be free of damage thereby enhancing the cosmetic qualities of the mower.

This compartmental structure of the deck section is much stronger than current designs as it accounts for the directly proportional increase in the moment of inertia relative to the moment. For example, where the moment is greatest in the center of the deck the moment of inertia is correspondingly high and therefore the deepest portion of the deck is designed. As the moment decreases towards the edges of each deck section, the moment of inertia is reduced accordingly by decreasing the spacing between the top and bottom decks. This tapered design also facilitates a reduction in the extra material and weight at the tapered ends of each deck section where the moment is lowest.

Wherefore, it is an object of the present invention to overcome the above mentioned shortcomings and drawbacks associated with the prior art.

Another object of the present invention is to provide a less complicated and more durable mechanical system for articulation of the mower adjustment for cutting height, repair and maintenance configuration and extension wing inclination.

A further object of the present invention is to provide the improved mechanical system with a range of motion articulating the center section of the mower from an operable substantially horizontal cutting position to a substantially vertical maintenance and repair position.

Yet another object of the present invention is to provide an upper and a lower deck to the mower body having greater structural integrity and improved moment of inertia and an exterior profile for facilitating the cleaning and shedding of debris.

A still further object of the present invention is to provide a double deck mower such that damage is limited to the underlying lowerdeck and is not visible through the top deck spaced therefrom.

The present invention also relates to a rotary mower for use in combination with a motorized tractor having an attachment point for releasably connecting the rotary mower to the tractor, the rotary mower comprising a main body having a front end defining a front support pivot and a rear end defining at least a rear support pivot, a hitch pole connected to and extending between the front support pivot and the attachment point of the tractor for pivotably supporting the front end of the main body, at least a pair of ground wheels rotatably connected to a first end of a ground wheel support arm connected to the rear support pivot for pivotably supporting the rear end of the main body, and a first variable length linkage substantially controlling pivoting of the ground wheel support arm about the rear support pivot and a second variable length linkage extending between the hitch pole and the rear support pivot for adjustably controlling a cutting height of the mower and maintaining the main body of the rotary mower substantially parallel with respect to the ground.

The present invention also relates to a method of providing a maintenance and repair position for a rotary mower used in combination with a motorized tractor, the method comprising the steps of building a main body having a front end defining a front support pivot and a rear end defining at least a rear support pivot, connecting a hitch pole between the front support pivot and the attachment point of the tractor for pivotably supporting the front end of the main body, rotatably connecting at least a pair of ground wheels to a first end of a ground wheel support arm connected to the rear support pivot for pivotably supporting the rear end of the main body, and controlling a cutting height of the mower and maintaining the main body of the rotary mower substantially parallel with respect to the ground by pivoting of the ground wheel support arm about the rear support pivot via a first variable length linkage connected between the rear support pivot and the main body and a second variable length linkage extending between the hitch pole and the rear support pivot.

BRIEF DESCRIPTION OF THE DRAWINGS

The invention will now be described, by way of example, with reference to the accompanying drawings in which:

FIG. 3 is a cross sectional view of a double deck mower having the top deck formed from several inverted U-shaped panels;

FIG. 4. is a cross sectional view of a double deck side extension or wing having the top deck formed from several inverted U-shaped panels;

FIGS. 5 & 6 are elevation views of a mower and associated articulating linkages of a first embodiment shown in a lower cutting position and in a raised cutting position;

FIGS. 9 and 10 are elevation views of a mower and associated articulating linkages of a second embodiment shown in a lower cutting position and in a raised cutting position;

FIGS. 13 and 14 are elevation views of a mower and associated articulating linkages of a third embodiment shown in a raised cutting position and in a lower cutting position;

FIG. 24 is a schematic diagram of the hydraulic control of the embodiment shown in FIGS. 20–23;

DESCRIPTION OF PREFERRED EMBODIMENT(S)

In the several embodiments throughout the following description the numbering system of like parts are maintained in increments of 100.

Figure 1:
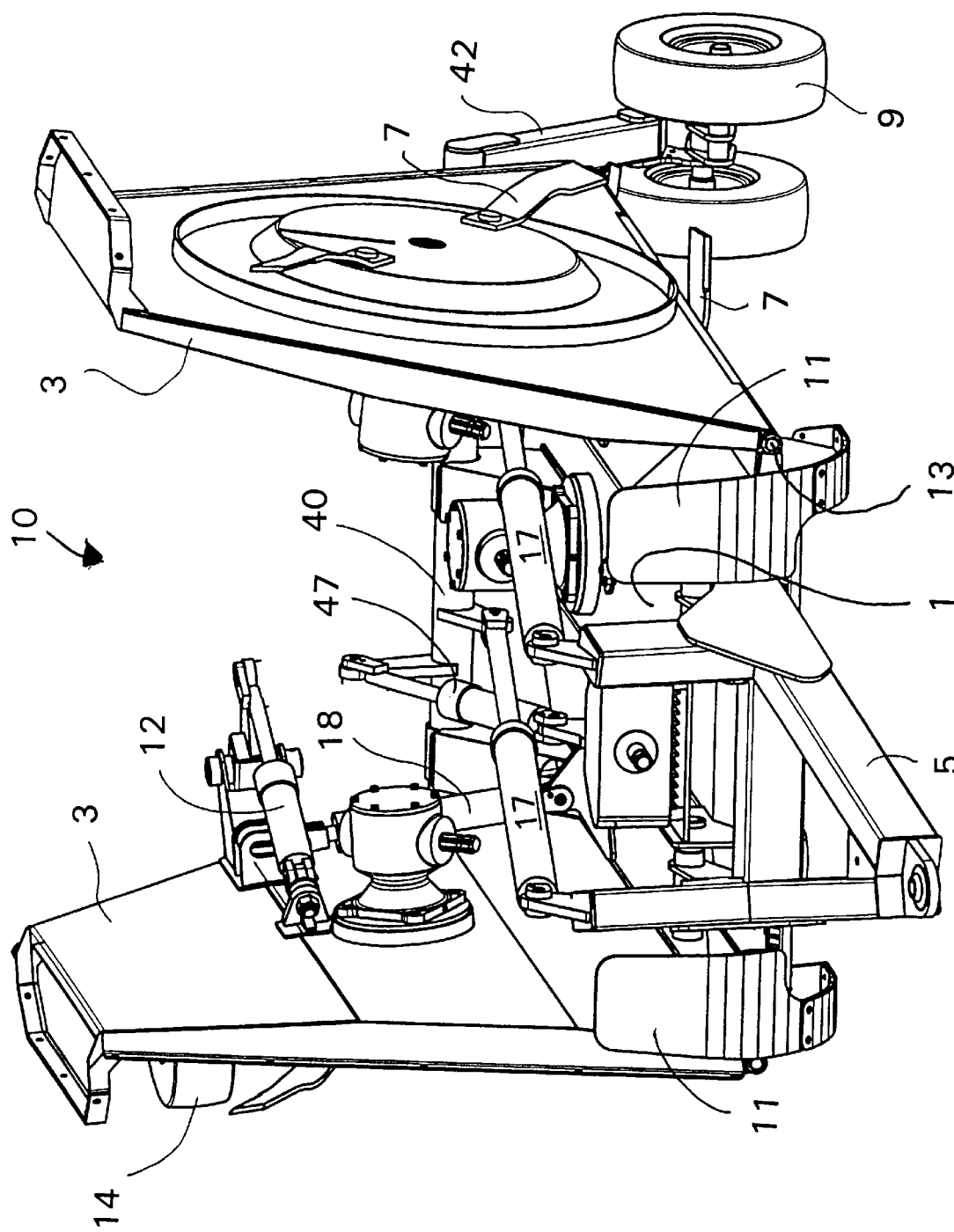
FIG. 1 is a perspective view of one embodiment of a mower according to the present invention.

Turning now to FIG. 1, a description concerning the various components of the present invention will now be briefly discussed. As can be seen in this embodiment, the cutting device, or mower, indicated generally at 10, includes a central main body section 1 and a pair of hinged side extension or wings 3, for pivotable movement with respect to the center section about a hinge axis 13. The mower is in general pulled by a motorized vehicle for instance a tractor (not shown), and is attached to the tractor via a hitch pole 5 which is pivotally attached to a front portion of the main body 1. The articulation of the main body section 1, side extensions 3 and hitch pole 5, is controlled by various hydraulic cylinders, to be discussed in further detail below, and these cylinders are, as is known in the art, coupled to a pump and an operator control via hoses (not shown).

The mower 10 is supported at a rear end by a number of ground wheels 9 which are rotatably supported at an end of a ground wheel support arm 42 and remain in contact with the ground during mowing operations. The ground wheel support arm 42 is pivotally connected at a second end to the main body 1 of the mower 10 via a support axle 40 to facilitate the raising and lowering of the main body 1 relative to the ground wheels 9 for adjustment of cutting height.

For mowing operations the raising and lowering of the main body 1 for adjustment of cutting height is controlled via the hitch pole 5 being further connected through a linkage with the road wheel support arms 42 via at least a main, or a pair of main hydraulic cylinders 47 and a secondary solid link hydraulic cylinders 17. The main hydraulic cylinders 47 are utilized to raise and lower the main body 1 to adjust the cutting height, and further hydraulics 12 respectively raise and lower the side extensions 3 with respect to the associated side extension ground wheel 14. Further hydraulics 18 may be added to the attached side extensions 3 to raise and lower the side extensions 3 to and from the vertical travel position as shown in FIG. 1. It is to be appreciated that during mowing operations the inclination of the side extensions 3 relative to the main body 1 is substantially free of hydraulic actuation, and the extensions 3 are inclined and declined relative to the main body due to the influence from the associated ground contour following wheels 14 on each side extension 3.

In addition to cutting height adjustment these hydraulic cylinders 12, 17, 18 and 47 are utilized to raise and lower side extensions 3 and the main body 1 of the mower 10 such that maintenance and repair can be easily conducted. As will be discussed in further detail below, the main body 1 may be raised from a substantially parallel cutting position to a substantially perpendicular maintenance position with respect to the ground to provide access to the main cutting blades of the main body 1 for service and maintenance.

During mowing operations and cutting height adjustment operations the secondary hydraulic cylinders 17 are maintained as a substantially solid link. As solid link hydraulic cylinders 17 remain in such a static or solid link position, the main hydraulic cylinders 47 control the cutting height adjustment. When it is desirable to raise the mower to a vertical maintenance and repair position, the secondary hydraulic cylinders 17 are retracted raising the main body 1 to a perpendicular maintenance position by rotating the main body about the hitch pole pivot and the skids 11 on the front portion of the mower 10 with the main hydraulic cylinders 47 remaining substantially as a solid link. It should be noted that skids 11 could be in the alternative, wheels or other type of ground contacting support as is known by those of skill in the art.

Figure 2:
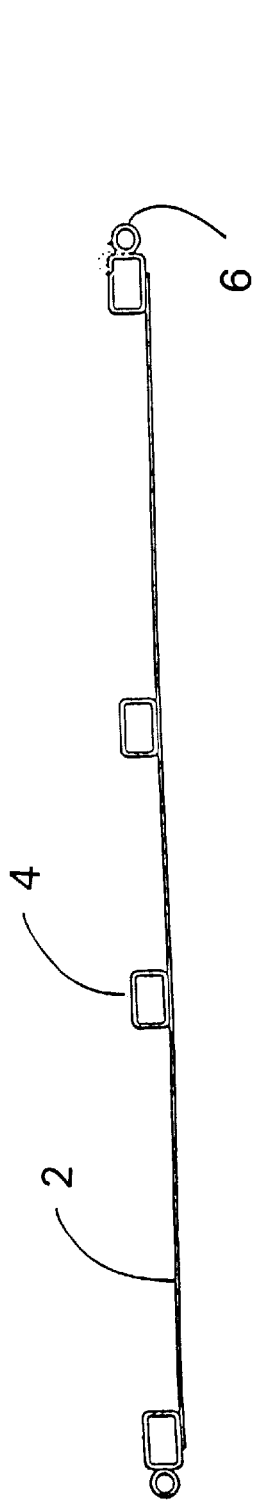
FIGS. 2 and 2A are cross sectional views of prior art mower decks.
Figure 2A:
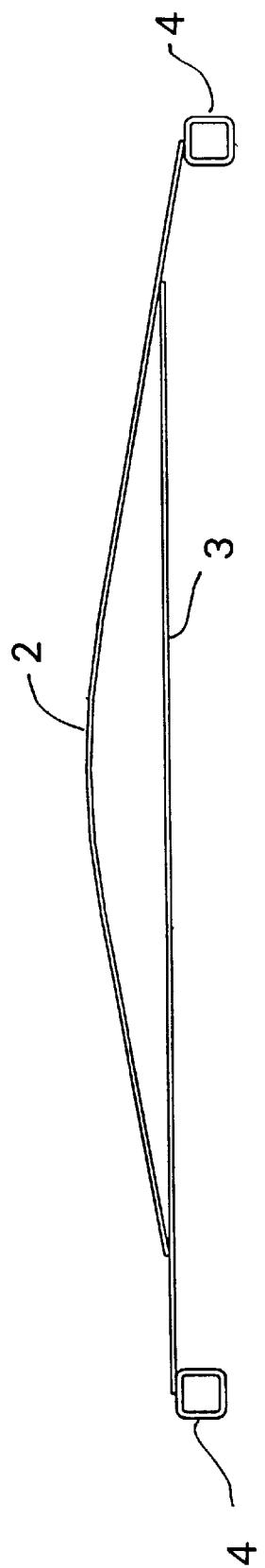

FIGS. 2 and 2A indicate the prior art, the main deck 2 of a rotary mower in one version as previously known is conventionally formed utilizing a single piece of sheet metal which is structurally reinforced with longitudinal supports 4, the outer most of which, located adjacent the edges of the main deck 2, define the hinge axis 6 about which the side extensions 3 of the mower tend to rotate. It is to be appreciated that the areas in between the long support 4 are not only susceptible to collection of water and debris but are provided with little rigidity making the deck susceptible to dents and undesirable flexing and bending moments. Other mower decks include a top and bottom deck sheet 2, 3 defining a single space there between and each of the top and bottom deck sheets 2, 3 are welded at a first respective ends to one another and are welded at second opposing ends to a supporting structural steel tube along either edge.

As shown in FIG. 3, the main body 1 of the mower 10 described herein is formed having a top deck 20 and a bottom deck 30. The top and bottom deck 20 and 30, respectively, are spaced apart creating a number of air pockets or spaces S separating the top and bottom decks 20,30. The dual deck design is to increase structural rigidity and protection of the top deck 20 from rocks and debris which tend to impact and dent the bottom deck 30. Additionally, the top deck 20 is formed with a slope relative to the bottom deck 30, so that shedding and cleaning debris and water from the exterior surface of the top deck is facilitated.

The panels can be formed from sheet metal or any other material with the proper characteristics. It is also well known in the art the different manufacturing processes to form the U-shaped panels such as stamping or bending for sheet metal.

The top deck 20 is comprised of several inverted U-shaped panels. In an embodiment of the present invention three U-shaped panels are utilized but any number may be used. The main deck consists of a first and second side panels 21 and 23 respectively, and a central U-shaped panel 25. The central U-shaped panel 25 has first and second support members 27 and 29 of equal length which define the sides of the central U-shaped panel 25, and a base section 28 extending between the first and second support members 27 and 29. The outer surface of this base portion becomes a central section of the top deck 20 of the main body 1. The central U-shaped panel 25 is fastened to the bottom deck 30 by methods known in the art such as welding. Support members 27 and 29 are fastened to deck 30 so that base 28 forms the central section of the top deck 20.

The first and second U-shaped side panels 21 and 23 are positioned on opposing sides of the central U-shaped panel 25. The side panels 21 and 23 are formed in a similar manner as that of the central U-shaped panel 25, having a first and second support member 39 and 41 and a base section 38 extending between the first and second support members 39 and 41. However, one of the first and second support members 39 and 41 of the side panels 21 and 23 are generally formed shorter than the respectively opposing support member. Typically the outer most support member 39, adjacent the longitudinal side edges 31 of the main body 1, is formed shorter than the associated inner support member 41. When fastened or welded to the substantially level bottom deck 30 a downward sloping section 38 is formed. The slope is for the purpose of shedding water, oil, dirt, vegetative matter or any type of liquid or solid debris that falls onto the top deck 20 of the main body 1 and to facilitate cleaning thereof.

With the center U-shaped panel 25 and the adjacent first and second U-shaped side panels 21 and 23 welded to the bottom deck 30, it is to be appreciated that the inner support member 41 of the first and second side panels 21 and 23 respectively abut the opposing support members 27 and 29 of the central U-shaped panel. This creates a top deck 20 having a constant slope to facilitate the shedding and cleaning of debris accumulating on the top deck 30. The base panels 28 and 38 of all the respective U-shaped panels are substantially contiguous being joined along a welded or pressed seam at the abutment of the support members 41 and 27 and 29 respectively to add structural integrity.

The main body 1 is further defined by the front end and a rear end separated by the longitudinal side edges 31. The U-shaped panels 21, 23 and 25 run longitudinally from the front end of the main body to the rear end of the main body 1, with the outer support members 39 of side panels 21, 23 running parallel and adjacent the longitudinal edges 31. In addition, at the longitudinal edge 31 of the main body and adjacent the shorter outer support member 39 is positioned a longitudinal hinge 33 defining hinge axis 13 to which the side extensions 3 will be ultimately attached and rotatable about.

It is to be appreciated that the U shaped panels could be formed with any number of different slopes by varying the length of the respective support members. The U shaped panels could also be used as the bottom deck 30 and the single sheet conformingly fabricated to define the sloped top deck 20.

Observing again FIG. 1, the side extensions 3, or wings are connected to the main body 1 by a longitudinal hinge along the longitudinal side edges 31 to allow the side extensions to rotate about the hinge axis 13. The side extensions 3 are supported by the hinge 33 along the axis 13 and are rotated thereabout via at least a side extension hydraulic cylinder 16 and linkage extending between the main body 1 and the side extension 3, the side extension hydraulic cylinder 16 being utilized to rotate the side extension 3 about the hinge axis 13 relative to the main body 1.

Turning now to FIG. 4, the side extensions 3 may be constructed in much the same manner as the main body 1. The side extensions 3 are formed having a top deck 120 and a bottom deck 130. The top and bottom deck 120, 130, respectively, are spaced apart creating an air pocket or space S separating the top and bottom decks 120,130.

The top deck 120 is comprised of several inverted U-shaped panels, namely, a first and second side panels 121,123 respectively, and a central U-shaped panel 125. The central U-shaped panel 125 is formed having an equal length first and second support members 127 and 129 which defines the sides of the central U-shaped panel 125, and supports base section 128. The outer surface of the base section 128 becomes a central section of the top deck 120 of the side section 3. The central U-shaped panel 125 is welded to the bottom deck 130 via support members 127 and 129 so that base 128 is spaced from the bottom deck 130.

The first and second shaped side panels 121 and 123 are positioned on opposing sides of the central-U shaped panel 125. The side panels 121 and 123 are formed having a first and second support members 139 and 141. Side panels 121 and 123 are formed in a similar manner to side panels 21 and 23 to create the tapered slope of top deck 120. Just as with the main body, the slope is intended for the purpose of shedding water, oil, dirt, vegetative matter or any type of liquid or solid debris that falls onto the top deck 120 of the side extensions 3.

The side extensions 3 are attached to the main body 1 along hinge axis 13 via hinge 33. The side extensions 3 have a mating hinge 133 on an inner side where each respectively connects to the main body. The opposite outer most edge 132 of the side extensions 3 may be equipped with a brush guard or debris chains (not shown) as is known in the art to alleviate the danger of debris being thrown or ejected from under the mower 10.

Turning now to FIGS. 5–8 a preferred embodiment of the mower 10 according to the present invention will now be described. The cutting height as well as the raising and lowering of the mower 10 is controlled by a mower mechanical linkage system. The secondary hydraulic cylinder 17 is pivotally attached from a first end at pivot point 16 via hitch pole brace 19 on a hitch pole 5, to a second end in communication with a ground wheel support 41 attached to the rear portion of the main body 1 to be described in further detail below.

It is important to realize that during cutting height adjustment operations secondary hydraulic cylinder 17 acts as a substantially solid link. I.e. a solid mechanical link could be inserted between pivot points 16 and 44. As a solid link, secondary hydraulic cylinder 17 transfers the appropriate force vectors generated by the main hydraulic cylinder 47 control of the ground wheel support 41, to the hitch pole 5 to appropriately adjust the front end of the main body 1 and hitch pole connection such that the main body 1 remains substantially parallel to the ground. It should also be noted that in this embodiment pivot point 16 is above hitch pole pivot point 18 with respect to ground. When the pivot point 16 is in this position, to raise the mower to a substantially vertical position with respect to ground, the secondary hydraulic cylinder 17 is no longer maintained as a substantially solid link, but becomes moveable so as to retract.

The ground wheel support 41 includes a number of spaced apart ground wheel support arms 42 each rotatably supporting at a first end at least a ground wheel 9. A second end of each spaced apart support arm 42 is rigidly attached to a ground wheel support axle 40. Support axle 40 extends substantially parallel with the rear end of the main body 1 and defines a pivot axis 49 which is fixed with respect to the main body 1 and about which the support arms 42 and associated wheels 9 rotate. It is to be appreciated that such rotation of support axle 40 adjust the mower cutting height, i.e. the main body 1, with respect to the ground. The pivot axis 49 is the point about which the ground wheel support arms 42 are influenced to rotate by leverage applied from the main hydraulic cylinders 47 which apply a direct force to influence the secondary solid link hydraulic cylinders 17 to thus rotate the hitch pole 5 about pivot point 18 and consequently adjust the mower cutting height.

The ground wheel support axle 40 includes a first and second radial extensions 48 and 43 each fixedly attached to the axle 40 and defining pivot points 45 and 44 respectively. The secondary solid link hydraulic cylinder 17 attaches at pivot point 44 and the main hydraulic cylinder 47 attaches at pivot point 45. The radial extensions 48 and 43 are angularly spaced at an obtuse angle about the pivot axis 49 defined by the axle 40. This angular separation which is in the range of about 70 to 180 degrees, more preferably about 80 to 110 degrees and provides separate rotational torque impetus to the axle 40 to provide more accurate control of the cutting height adjustment.

The rotational torque control provided by each of the pairs of the secondary solid link hydraulic cylinders 17 and the main hydraulic cylinders 47 work together to control the ground wheel support arm and leverage it against the ground via the wheels 9 thereby raising and lowering the main body 1. For cutting height control of the side extensions 3 hydraulic cylinders 12 (shown in FIG. 1) are used to raise and lower side extensions 3 of the mower with respect to the ground.

Observing FIG. 5, the present embodiment has the secondary hydraulic cylinder 17 substantially fully extended and the main hydraulic cylinder 47 substantially fully retracted to position the mower 10 in its lowest most cutting position having the main body 1 of the mower 10 and the cutting blades 7 substantially adjacent or very close to the ground. FIG. 6 shows the highest cutting position of mower 10 with the secondary solid link hydraulic cylinder 17 substantially fully extended, and the main hydraulic cylinder 47 substantially fully extended. The main cylinder 47 substantially rotates the ground wheel support axle 40 about the pivot point 49 and raising, via support arms 42, the main body 1, and side extensions 3 to the highest operable cutting position. In cooperation with the hydraulic cylinder 47 throughout the cutting height adjustments, to ensure the main body 10 remains parallel to the ground, the secondary hydraulic cylinder 17 continues as a substantially solid link maintaining a primarily downward force on the hitch pole 5 to support the front end of the main body at substantially the same height as the rear end.

The present invention also includes a maintenance facilitating position wherein the mower 10 may be rotated to a substantially perpendicular or vertical position with respect to the ground. This positioning described in detail below thereby exposes the underside of the main body 1 as well as the side extensions 3 of the mower 10 and the respective blades 7 such that maintenance or repair work can be performed.

Figure 7:
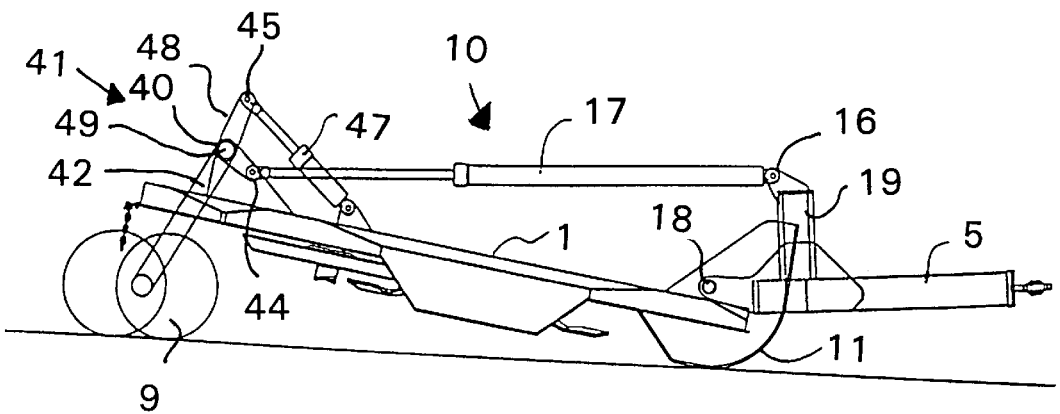
FIGS. 7 & 8 are side elevation views of mower and associated articulating linkages of the first embodiment shown in an initial raising position and in a completely upright raised vertical position for purposes of repairs and maintenance.
Figure 8:
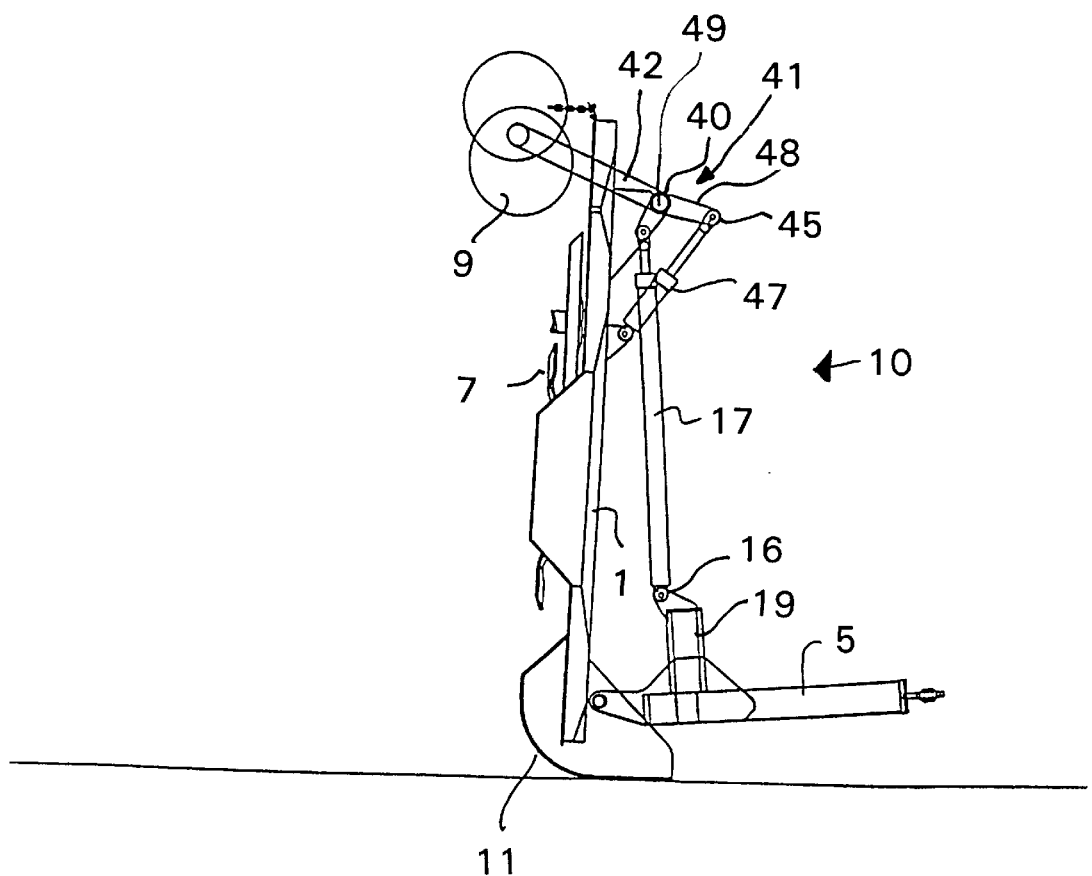

FIGS. 7 and 8, show the mower 10 being lifted into a vertical position. As previously discussed the secondary hydraulic cylinders 17 are no longer acting as a solid link during this operation. The engagement of the secondary hydraulic cylinders 17 now create a substantially opposite and upward force transferred through the hitch pole 5 to the connection between the tractor and the mower. The weight of the tractor (not shown) is used to counter act such an upward force caused by the weight of the mower rotating about pivot point 18 on the skids 11.

From the mower's highest cutting position as shown in FIG. 6, and with the main hydraulic cylinders 47 remaining mostly fully extended and acting as a substantially solid link, the secondary hydraulic cylinders 17 is retracted. Rotation of the axle 40 is prevented by either hydraulically locking the linkage or mechanically locking the ground wheel support linkage 41. The support axle 40 can rotate through an angle of 0 to 90 degrees and more preferable about 0 to 45 degrees for providing the variable cutting height adjustment. At the highest cutting position where the rotation of the axle 40, and thus the support arms 42 and the ground wheels 9 can no longer raise the main body 1, a potential mechanical lock-up of the mechanism is caused. The continued retraction of the secondary cylinders 17 at this point manifests a depression of the hitch pole 5 and the front end of the main body 1 such that the front end of the mower 10 is inclined towards the ground causing the skid plate 11 in direct contact with the ground. With the secondary hydraulic cylinder 17 continuing to retract, the rear end of the mower 10 and the ground wheels 9 are lifted from contact with the ground and the main body 1 is rotated about hitch pole pivot point 18 to a vertical repair and maintenance position.

Observing FIG. 8, a substantially complete retraction of the secondary hydraulic cylinder 17 has now pulled the main body 1 of the mower 10 up to a substantially perpendicular position with only the skid plates 11 in contact with the ground and so that the blades 7 of the main body 1 and extension wings 3 are exposed.

FIGS. 9–12 disclose a second embodiment of the present invention. The main body 1 of mower 10 is raised and lowered by a substantially different mechanical linkage system and hitch pole design than the first embodiment. The second embodiment, as with the first, once again utilizes at least one pair of hydraulic cylinders, a secondary hydraulic cylinder 117 and a main hydraulic cylinder 147 operating a lever link 155. Hydraulic cylinders 117 and 147 are coupled to ground wheel support 141 via extension link 145. It can be appreciated that the main hydraulic cylinders 147 control the cutting height adjustment as in the previous embodiment, the secondary hydraulic cylinder 117 act as a solid link during cutting height adjustment, but becomes moveable for raising the mower 110 to a substantially vertical position with respect to the ground.

One end of the secondary pull-up hydraulic cylinder 117 pivotally attaches to hitch pole brace 119 at brace pivot point 116 spaced above the hitch pole pivot point 118 which is necessary for adjusting the cutting height and raising the mower 110 to a substantially vertical position with respect to the ground. The second end of hydraulic cylinder 117 is pivotally secured to lever link 155.

Lever link 155 is rotatably fastened to lever link pivot point 157 on fixed member 159 attached to the top of the main body. The lever link 155 is also pivotally connected to the main hydraulic cylinder 147 and to extension link 145. Rotation of lever link 155 occurs about lever link pivot point 157 such that a pushing or pulling force applied by the main hydraulic cylinders 147 causes the lever link 155 to rotate in a clockwise or counter clockwise direction. The hydraulic cylinder 147 is pivotally attached at one end to lever link 155 and at a second end to the top deck 120 of the mower 110.

Ground wheel support 141 includes a number of spaced apart ground wheel support arms 142 each rotatably supporting at a first end at least a ground wheel 109. A second end of each spaced apart support arm 142 is attached to ground wheel support axle 140. The support axle 140 extends substantially parallel with the rear end of the main body 1 and defines a pivot axis 149 which is fixed with respect to the main body 1 and about which the support arms 142 and associated wheels 109 rotate. Support arms 142 and links 143 are rigidly fixed to support axle 140 and radially extending from pivot point 149 so that as support axle 140 rotates a constant angle α is maintained between support arms 142 and rigid link 143 about axis 149.

The lever link 155 is controlled by the main hydraulic cylinder 147 transferring the rotational torque to the support axle 140 via extension link 145 and rigid link 143 and causes support arms 142 and ground wheels 109 to rotate about support axis 149. Thus, the secondary hydraulic cylinder 117, which acting as a substantially solid link bar pivotally attached to the free end of rigid link 143 via extension link 145, provides the leverage for assisting in the raising and lowering of the cutting height of mower 110 through the hitch pole 105 and main body 1 connection.

FIG. 9 shows the second embodiment in the lowest cutting position. The lowering of the main body 1 of the mower 110 is accomplished by the main hydraulic cylinder 147 being substantially fully retracted. To lower the main body 1 the lever link 155 is rotated in a counter clockwise direction such that the main hydraulic cylinder 147 is substantially retracted and the secondary cylinder 117 remains substantially fully extended acting as a solid link and the main body 1 of the mower 110 has been lowered to a position substantially adjacent to the ground.

FIG. 10 generally shows the mower 110 in the highest cutting position. The hydraulic cylinder 147 is actuated and extends rotating lever link 155 in a clockwise direction. This clockwise movement of lever link 155 causes extension link 145 to rotate rigid link 143 in a counter clockwise direction and thus rotate support axle 140. The support axle 140 then rotates the support arm 142 in such a manner so as to push the ground wheels 109 under the main body 100 and to raise the main body 100 relative to the ground. In cooperation with the hydraulic cylinder 147 throughout the cutting height adjustments, to ensure the main body 110 remains parallel to the ground, the secondary hydraulic cylinder 117 continues as a substantially solid link maintaining a primarily downward force on the hitch pole 105 to support the front end of the main body at substantially the same height as the rear end.

Figure 11:
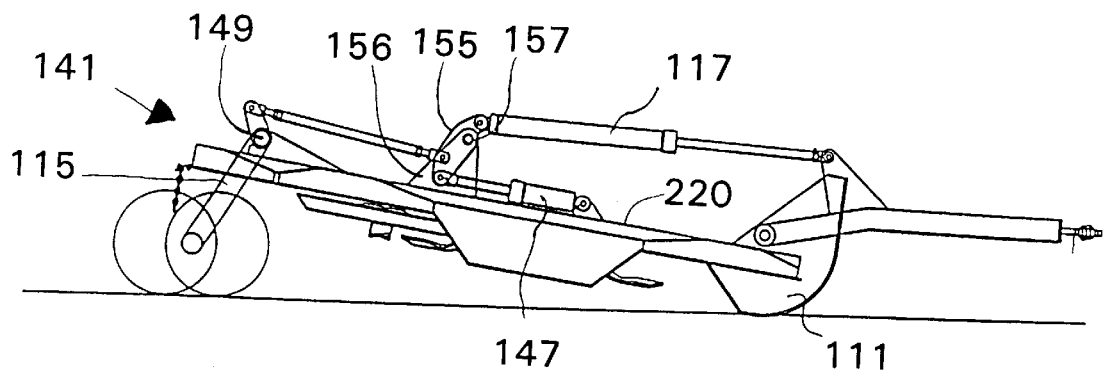
FIGS. 11 and 12 are side elevation views of mower and associated articulating linkages of the second embodiment shown in an initial raising position and in a completely upright raised vertical position for purposes of repairs and maintenance.
Figure 12:
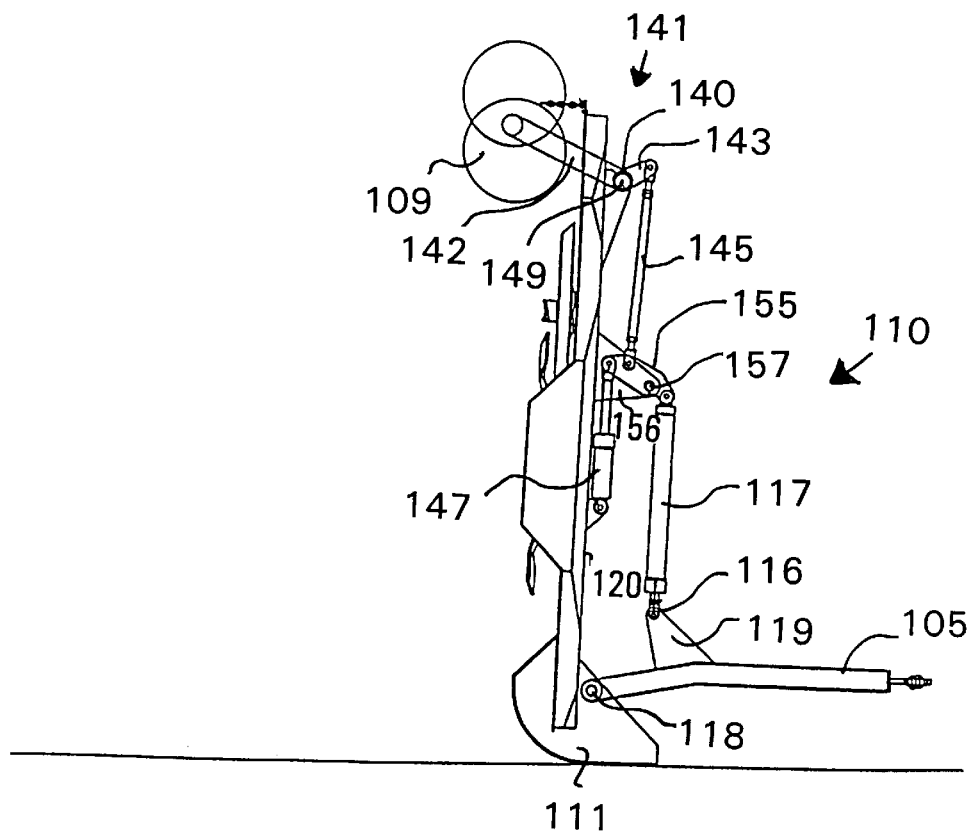

Observing FIGS. 11 and 12, with secondary cylinder 117 no longer acting as a solid link, retraction of the secondary hydraulic cylinder 117 and a substantially locked extension of the main cylinder 147 lowers the front end of the mower and brings the mower skids 111 into direct contact with the ground. The engagement of the secondary hydraulic cylinders 117 now create a substantially opposite and upward force transferred through the hitch pole 105 to the connection between the tractor and the mower. The weight of the tractor (not shown) is used to counter act such an upward force caused by the weight of the mower rotating about pivot point 118 on the skids 111. Continued retraction of hydraulic cylinder 117 causes mower 110 to rotate about hitch pole pivot point 118. With the skids in contact with the ground and continued retraction of hydraulic cylinder 117 begins to raise the ground wheel support 141 and the rear end of the mower 110 off the ground until the secondary hydraulic cylinder 117 is substantially fully retracted and the mower 110 is in a vertical position for purposes of repair and cleaning in FIG. 12.

Another embodiment of the present invention incorporates a further linkage system and hitch pole design to achieve the lowering and raising of the mower 210 for different cutting heights and for pivoting the mower 210 with respect to skids 211 and the ground for repair and maintenance as depicted in FIGS. 13–16. In this embodiment the secondary hydraulic cylinder 217 remains as a substantially solid link during cutting height adjustment, but during actuation of the mower into the vertical maintenance position, extends to rotate and lift the mower 210 with respect to skids 211 instead of retracting as in the previous embodiments.

The secondary hydraulic cylinder 217 is coupled to hitch pole 205 at a first end by way of a brace pivot point 216. It should be noted that in this embodiment of the present invention pivot point 216 is now spaced below hitch pole pivot point 218 with respect to ground. The second end of hydraulic cylinder 217 is directly pivotally connected to support arm 242 at a support arm pivot point 244 instead of being pivotally attached to intermediate links as in the previous embodiments.

To rotate the support arm 242 the main hydraulic cylinder 247 is pivotally secured to the top deck 220 of the mower 210 at one end and a second end to a free end lever portion of support arm 242 at support arm pivot point 248. When actuated, the main hydraulic cylinder 247 rotates the support arm 242 in a clockwise and counter clockwise direction about support axis 249. The primary function of main hydraulic cylinder 247 is the control of mower cutting height of mower 210 and to substantially lock the ground wheel support 241 when the secondary hydraulic cylinder 217 is actuated for lifting the main body of the mower 210 off the ground.

By extending the support arm 242 above the support axle 240 to act as a lever arm reduces the number of links needed for adjusting the mower cutting height. The extended lever design of support arm 242 requires a lesser force of hydraulic cylinder 247 to actuate ground wheel support 241. As in the previous embodiments support arm 242 is rigidly fixed to support axle 240 and pivots about pivot axis 249 when actuated by main hydraulic cylinder 247.

FIG. 13 depicts the mower 210 in the highest cutting position with the main hydraulic cylinder 247 fully extended. The force is transferred to the lever arm portion of the support arm 242. The moment created by main hydraulic cylinder 247 causes a rotation of the support arm 242 in a counter clockwise direction about the support axis 249 and rotates the wheels 209 under the mower 210 and thus raises the mower cutting height.

Conversely, the mower is lowered by retracting the main hydraulic cylinder 247. This retracting of cylinder 247 causes support arm 242 to rotate in a clockwise direction about pivot point 249. This rotation forces the support wheel 209 away from the mower thus lowering the mower cutting height. FIG. 14 shows the mower in the lowest cutting position with the main hydraulic cylinder 247 in a retracted state. In cooperation with the hydraulic cylinder 247 throughout the cutting height adjustments, to ensure the main body 210 remains parallel to the ground, the secondary hydraulic cylinder 217 continues as a substantially solid link maintaining a primarily downward force on the hitch pole 205 to support the front end of the main body at substantially the same height as the rear end.

Figure 15:
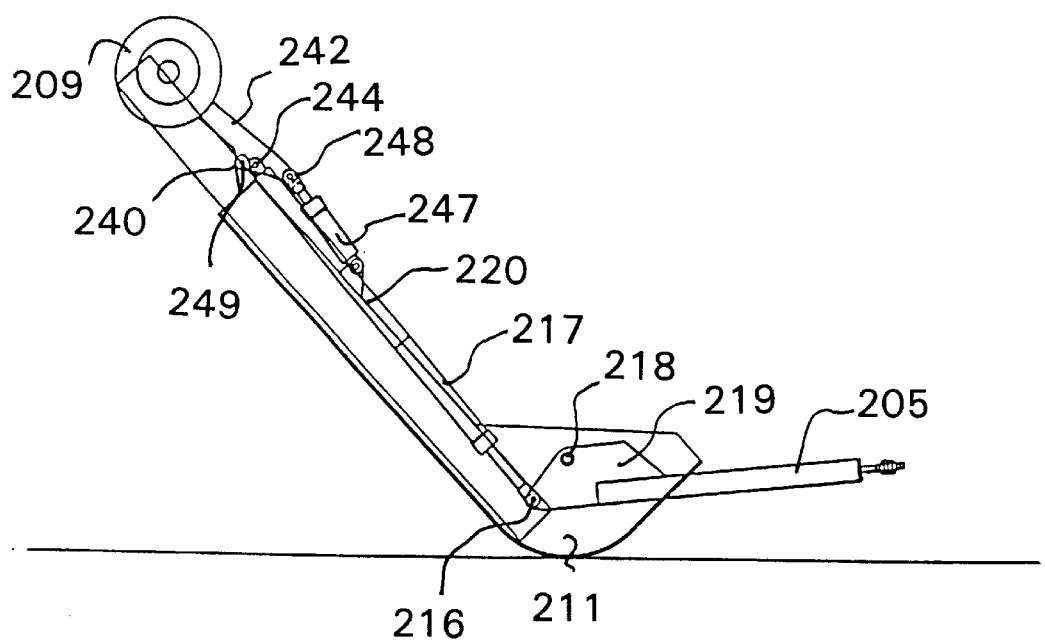
FIGS. 15 and 16 are side elevation views of mower and associated articulating linkages of the third embodiment shown in an initial raising position and in a completely upright raised vertical position for purposes of repairs and maintenance.
Figure 16:
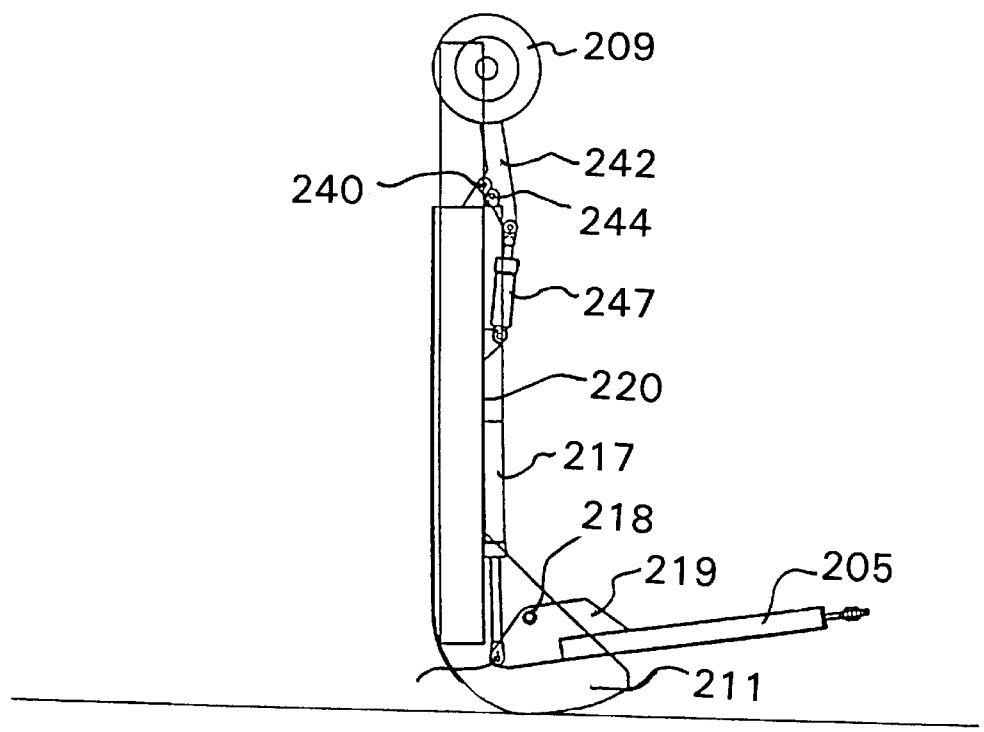

To raise the mower 210 into a vertical position mower 210 is first adjusted to the lowest cutting position. In the lowest cutting position main hydraulic cylinder 247 becomes substantially locked. The secondary push up hydraulic cylinder 217 is then actuated to extend. With the free end of hitch pole 205 coupled to a tractor, the push up force transmitted by cylinder 217 causes the mower 210 to rotate about hitch pole pivot point 218 up on to the skids 211. The engagement of the secondary hydraulic cylinders 217 now creates a substantially opposite and upward force transferred through the hitch pole 5 to the connection between the tractor and the mower. The weight of the tractor (not shown) is used to counter act such an upward force caused by the weight of the mower rotating about pivot point 218 on the skids 211. Continued extension of the hydraulic cylinder 217 begins to raise the mower 210 as depicted in FIG. 15 until finally the mower 210 reaches a substantially vertical position as viewed in FIG. 16. In this position the underside of the mower 210 is accessible to service and maintenance.

It is to be appreciated that by repositioning the pivot fastening points 248, 244 and 249 along the support arm 242 will give slightly varied results. If both support axle 240 and consequently axis 249 were positioned in between pivot points 248 and 244 along support arm 242 then the main hydraulic cylinder 247 would not necessarily need to be in a substantially locked position when actuating secondary hydraulic cylinder 217 for lifting mower 210 off the ground. Referring to FIG. 14 the same effect could be achieved by having pivot point 244 and support axle 240 substantially on the same horizontal plane with respect to ground or having support axle 240 positioned slightly above pivot point 244.

Figure 17:
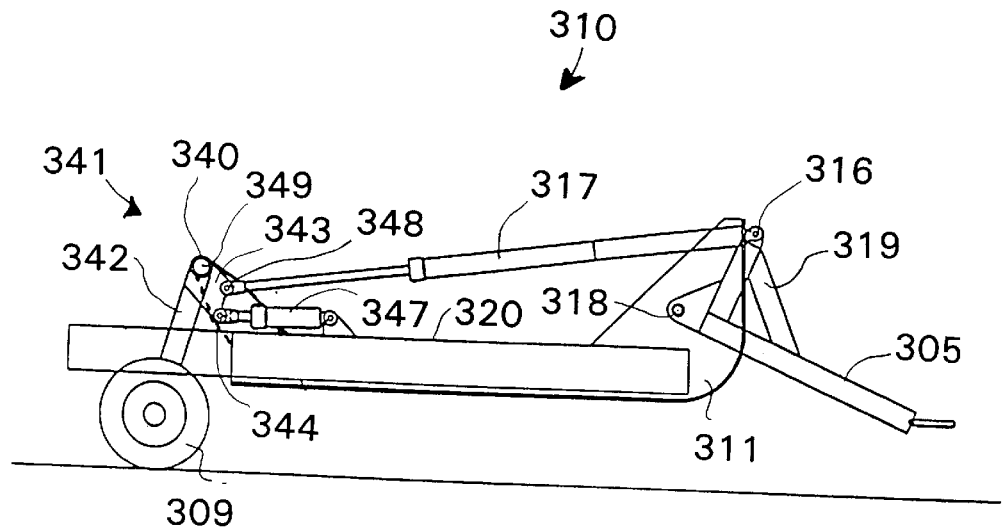
FIGS. 17 and 18 are elevation views of a mower and associated articulating linkages of a fourth embodiment shown in a raised cutting position and in a lower cutting position.
Figure 18:
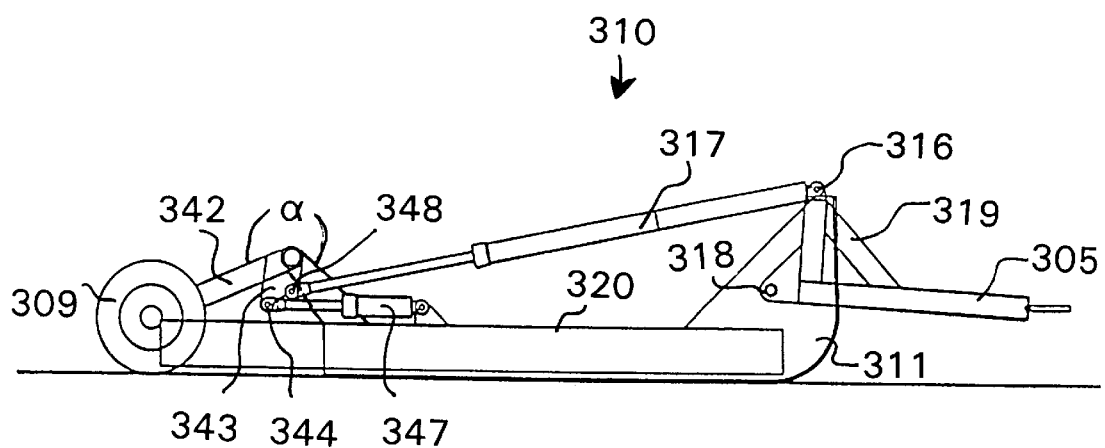
Figure 19:
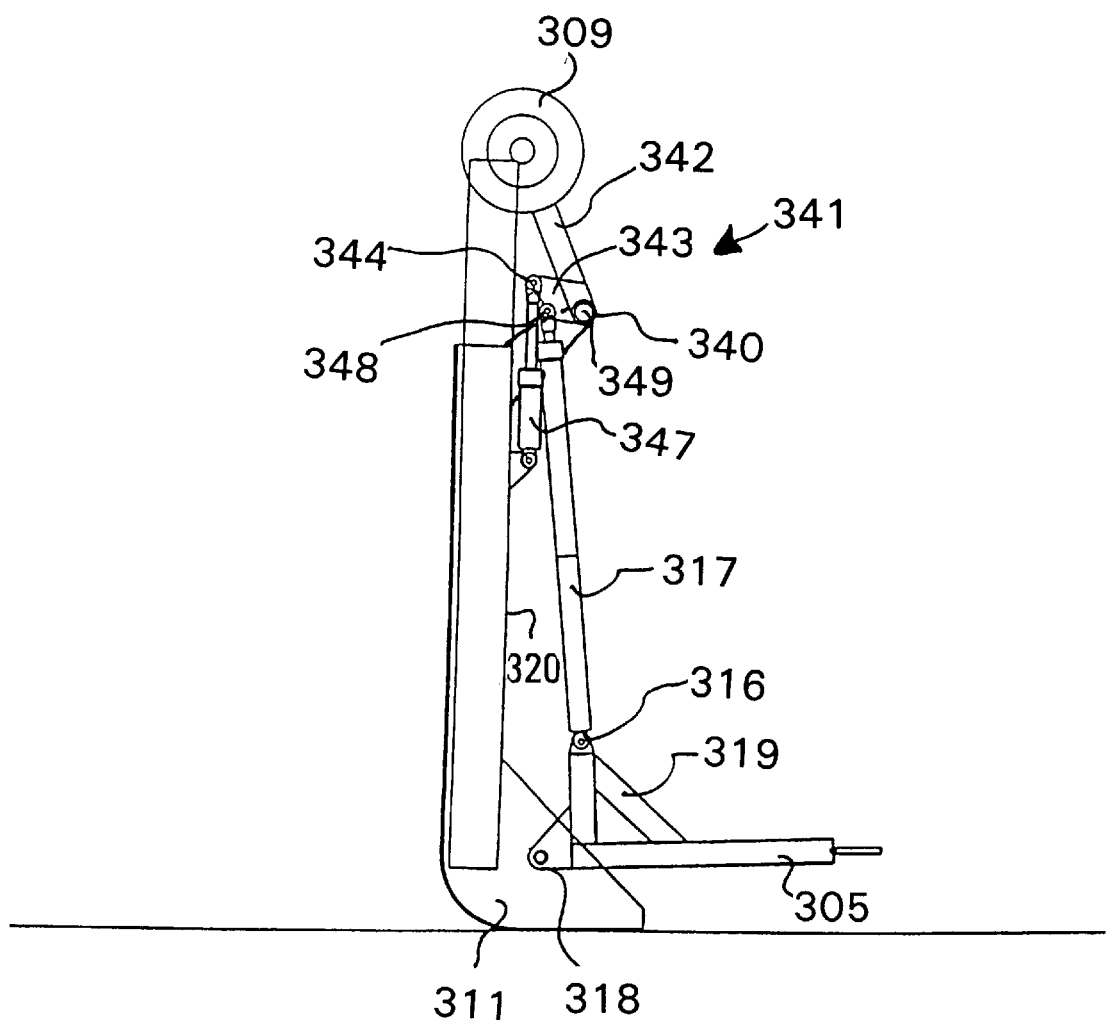
FIG. 19 is a side elevation view of a mower and associated articulating linkages of a fourth embodiment shown in a completely upright raised vertical position for purposes of repairs and maintenance.

In another preferred embodiment of the present invention a different arrangement of an articulating linkage system and hitch pole design are utilized for adjusting the mower cutting height and rotating the mower 310 to a substantially vertical position with respect to ground for maintenance and service as illustrated in FIGS. 17–19. In the present embodiment the hydraulic cylinders 317, 347 shown are at least a single hydraulic cylinder and more preferably a pair of hydraulic cylinder implemented on the main body of mower 310.

A first end of secondary hydraulic cylinder 317 is pivotally secured to hitch pole brace 319 at brace pivot point 316. The coupling of the brace pivot point 316 is spaced above the hitch pole pivot point 318. With this arrangement the secondary hydraulic cylinder 317, again acting as a substantially solid link bar during cutting operations, must retract (pull up) to raise the mower 310 off the ground and into the vertical maintenance position. The second end of the hydraulic cylinder 317 is also pivotally secured to ground wheel support 341 via lever link 343 at pivot point 348.

Lever link 343 is rigidly secured and radially extends from support axis 349 of the support axle 340. Rotation of lever link 343 is performed in a clockwise and counter clockwise direction about the support axle pivot point 349 by the main hydraulic cylinder 347 which is pivotally coupled to lever link 343 as will be discussed below.

A support arm 342 is also rigidly secured to the support axle 340 at one end and a second end is connected to at least one ground wheel 309. Support arm 342 is utilized for the raising and lowering cutting position of the mower 310 via the articulating linkage system. The rigid radially extending lever link 343 and support arm 342 are secured to support axle 340 for transmission of forces and to minimize additional linking components. As the support axle 340 is rotated a constant angle α is maintained between support arm 342 and lever link 343 generally shown in FIG. 18.

One end of main hydraulic cylinder 347 is also pivotally fastened to lever link 343 at pivot point 344 and at the other end to the main body 320 of mower 310. When actuated, and with the secondary hydraulic cylinders acting as a solid link, main hydraulic cylinders 347 adjusts the height of the cutting position of mower 310. To raise the mower cutting height the main hydraulic cylinder 347 retracts and rotates lever link 343 in a counter clockwise direction about support axis 349. The force is then transferred to and causes support axle 340 to rotate in the counter clockwise direction. This rotation pivots support arm 342 in the counter clockwise direction about support axis 349 and raises the mower cutting height. FIG. 17 illustrates the mower 310 in the highest cutting position with main hydraulic cylinder 347 substantially fully retracted.

As can be seen in FIG. 18 mower 310 is in the lowest cutting position. To achieve this position main hydraulic cylinder 347 is actuated to be substantially fully extended. This time lever link 343 rotates in a clockwise direction about support axis 349. Support axle 340 then also rotates in a clockwise direction. This clockwise direction is transferred to support arm 342 which causes support wheel 309 to shift out and away from mower 310 about axis 349 to reach the lowest cutting position. In cooperation with the hydraulic cylinder 347 throughout the cutting height adjustments, to ensure the main body 310 remains parallel to the ground, the secondary hydraulic cylinder 317 continues as a substantially solid link maintaining a primarily downward force on the hitch pole 305 to support the front end of the main body at substantially the same height as the rear end.

Conversely, to raise mower 310 to a substantially vertical position as seen in FIG. 19 hydraulic cylinder 347 is engaged to a substantially locked position when in the lowest cutting position. The secondary hydraulic cylinder 317 is then actuated to retract. With the free end of hitch pole 305 attached to a tractor, and the retracting causes skids 311 in contact with the ground, the mower 310 pivots about the hitch pole pivot point 318 and the rear portion of mower 310 is lifted off the ground. The engagement of the secondary hydraulic cylinders 317 now creates a substantially opposite and upward force transferred through the hitch pole 305 to the connection between the tractor and the mower. The weight of the tractor (not shown) is used to counter act such an upward force caused by the weight of the mower rotating about pivot point 318 on the skids 311. Hydraulic cylinder 317 continues to retract until the mower is in a substantially vertical position.

It can also be appreciated that in this embodiment the mower 310 may be raised to a vertical position by substantially locking the main cylinder 347 in the fully extended position or the ground wheel support 341 when in the highest cutting position. The hitch pole 305 pivots about hitch pole pivot point 318 until the skids 311 come in contact with a surface. At which point the rear portion of mower 310 is lifted off the surface until a substantially vertical position is reached.

FIGS. 20–24 depict yet another embodiment of the present invention. In this embodiment the hydraulic cylinders 417 and 447 operate together and are hydraulically linked as shown in FIG. 24 to achieve height control.

The main function of the secondary hydraulic cylinder 417 is to raise and lower mower 410 from a horizontal position to a substantially vertical position for ease of accessibility of maintenance and repair. The secondary hydraulic cylinder 417 is pivotally coupled to hitch pole 405 at brace pivot point 416 at one end and to the main body 420 of mower 410 at pivot point 444 at a second end. Since the coupling of secondary hydraulic cylinder 417 and hitch pole 405 at pivot point 416 is below the hitch pole pivot point 418 with respect to the ground, to raise the mower 410 to a substantially vertical position secondary hydraulic cylinder 417 is actuated to extend.

Figure 20:
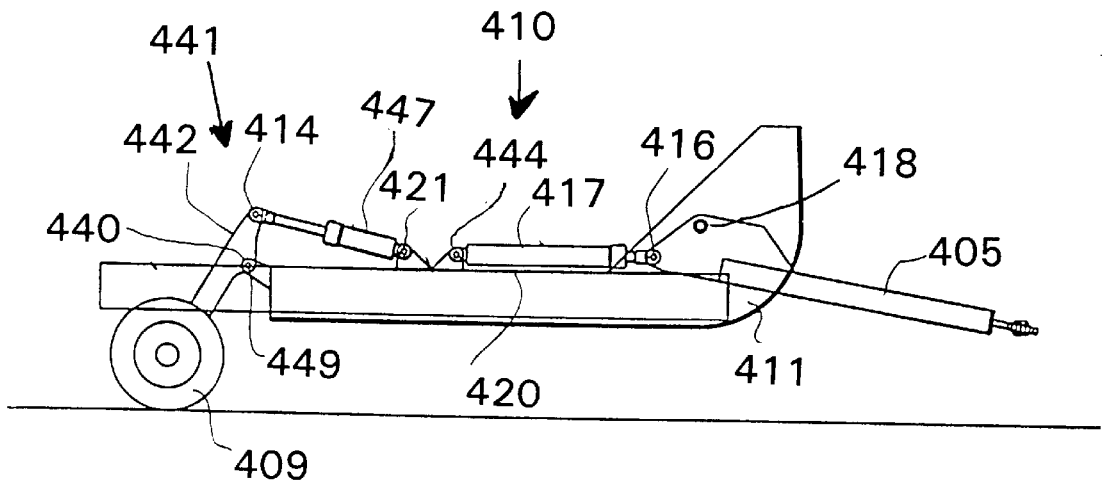
FIGS. 20 and 21 are elevation views of a mower and associated articulating linkages of a fifth embodiment shown in a raised cutting position and in a lower cutting position.

The purpose of the main hydraulic cylinder 447 is to adjust the cutting height of mower 410. This is achieved by pivotally coupling one end of hydraulic cylinder 447 to an extension lever arm portion of support arm 442 at support arm pivot point 414. The second end of hydraulic cylinder 447 is pivotally coupled to main body 420 of mower 410. FIG. 20 displays hydraulic cylinder 447 in an extended state and the mower 410 in the highest cutting position.

Support arm 442 is rigidly connected to support axle 440. As mentioned above, one end of support arm 442 is pivotally attached to hydraulic cylinder 447 while the second end is coupled to at least one ground wheel 409. The lever arm portion of support arm 442 radially extends from support axle 440 to act as a lever in the transmission of forces. Support arm 442 rotates about support axis 449 when hydraulic cylinder 447 is actuated.

To raise the mower 410 to the highest cutting position hydraulic cylinder 447 is actuated to extend. This causes the lever arm portion of support arm 442 to rotate in a counter clockwise direction. Which in turn causes the support axle 440 to also rotate in a counter clockwise direction. This results in the lower portion of support arm 442 to rotating in the counter clockwise direction and causes the ground wheels 409 rotate about axis 449 and raise the mower cutting height. FIG. 20 depicts mower 410 in the highest cutting position.

Figure 21:
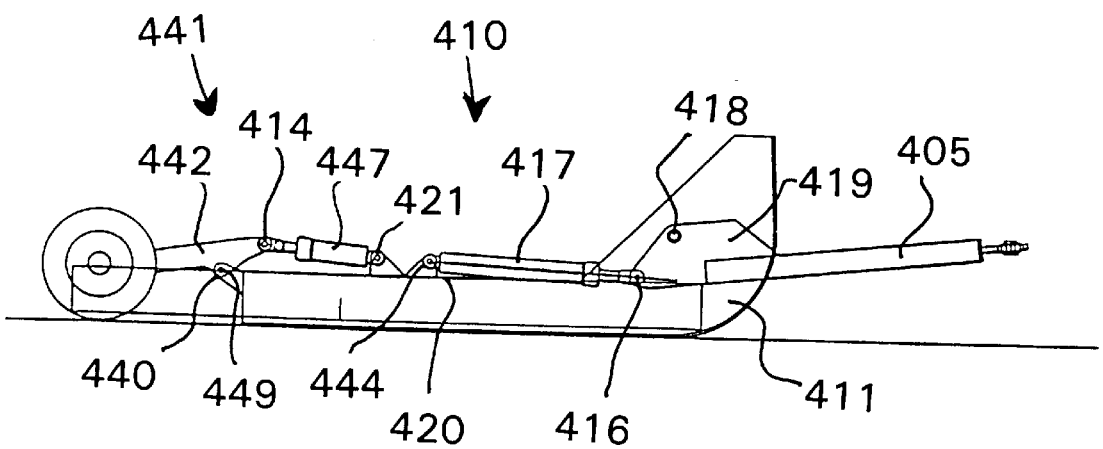

To lower the mower cutting height hydraulic cylinder 447 is engaged to retract. This causes support arm 442 to rotate in a clockwise direction about support axis 449. The clockwise motion extends to the lower portion of support arm 442 to where it attaches to ground wheels 409. Ground wheels 409 then move out from under and away from mower 410. FIG. 21 illustrates the mower 410 in the lowest cutting position with the main hydraulic cylinder 447 in a retracted position. It can be appreciated that the mower cutting height of mower 410 is performed without input from hydraulic cylinder 417 as shown generally in FIGS. 20–21. In cooperation with the hydraulic cylinder 447 throughout the cutting height adjustments, to ensure the main body 410 remains parallel to the ground, the secondary hydraulic cylinder 417 continues as a substantially solid link maintaining a primarily downward force on the hitch pole 405 to support the front end of the main body at substantially the same height as the rear end.

Figure 22:
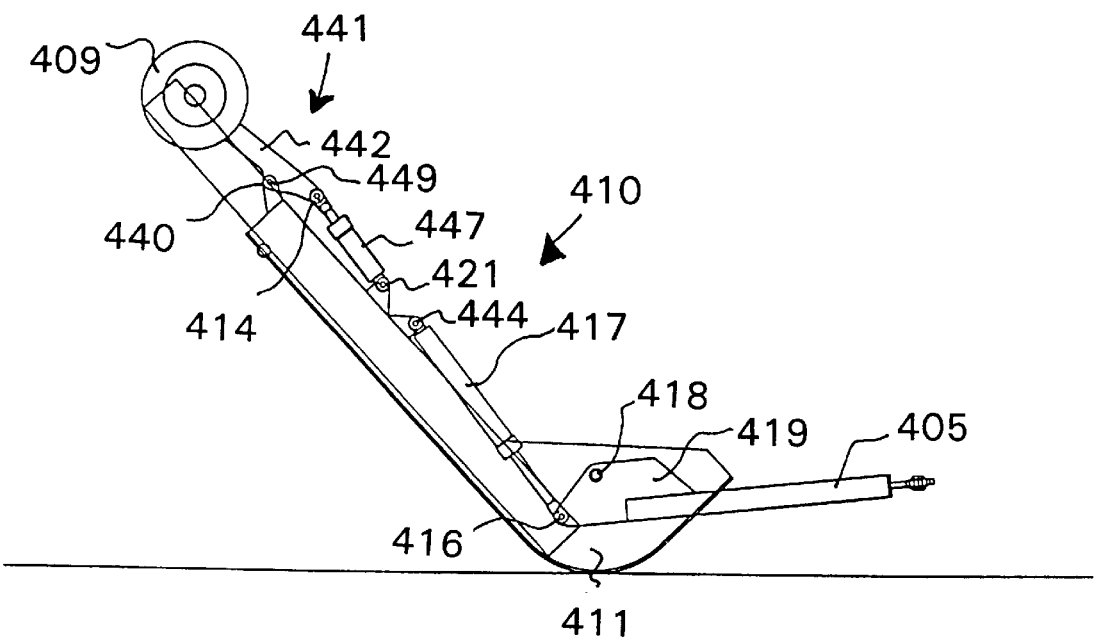
FIGS. 22 and 23 are side elevation views of mower and associated articulating linkages of the fifth embodiment shown in an initial raising position and in a completely upright vertical position for purposes of repairs and maintenance.
Figure 23:
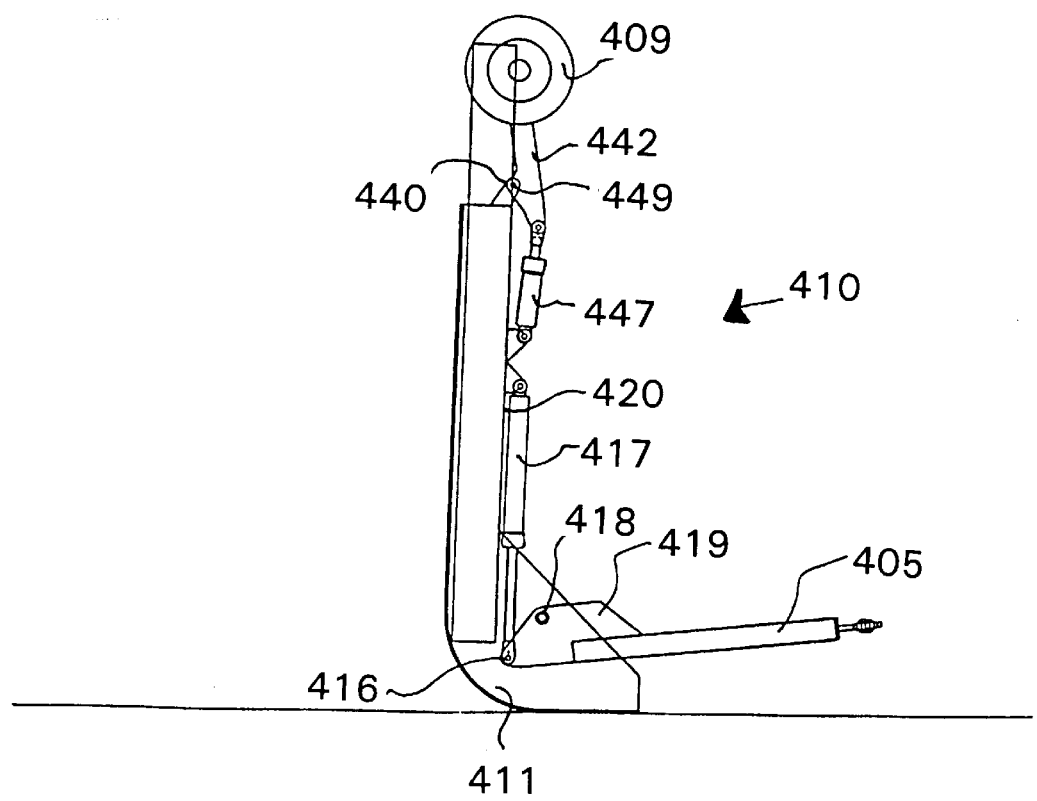

To lift the mower 410 into a substantially vertical position secondary hydraulic cylinder 417 must be actuated to extend. With a free end of hitch pole 405 coupled to a tractor and hydraulic cylinder 417 engaged mower 410 rotates about hitch pole pivot point 418. Skids 411 come in direct contact with the ground and continued extending of hydraulic cylinder 417 raises the rear portion of the mower 410 off the ground as illustrated in FIG. 22. The engagement of the secondary hydraulic cylinders 417 now creates a substantially opposite and upward force transferred through the hitch pole 405 to the connection between the tractor and the mower. The weight of the tractor (not shown) is used to counter act such an upward force caused by the weight of the mower rotating about pivot point 418 on the skids 411. With continued input to retract mower 410 continues to pivot on skids 411 until the mower 410 is in a substantially vertical position as depicted in FIG. 23. In this position the secondary hydraulic cylinder 417 is substantially fully extended and maintenance and repair can easily be facilitated.

Observing FIG. 24 a brief description of the hydraulics associated with the present embodiment is described. During normal mowing operations hydraulic fluid is sent from the tractor hydraulic control to the rod end 450 of the cylinder 447 causing it to retract and lower the mower body 401. The displacement of the fluid from the barrel side 451 of the main cylinder 447 goes to the rod side 460 of the secondary cylinder 417 which displaces that cylinder the required amount to pull the hitch pole 405 down, and in turn raise the mower at a constant rate off the ground. When the substantially vertical repair position is desired, with main cylinder 447 in the retracted position, a selector valve 470 is switched so fluid flow to main cylinder 447 is cut off.

Without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A rotary mower for use in combination with a motorized tractor having an attachment point for releasably connecting the rotary mower to the tractor, the rotary mower comprising:
   a main body having a front end having a front support pivot for connection to the tractor;
   at least a cutting blade for cutting vegetation, the cutting blade supported by the main body;
   the main body comprises a spaced apart bottom deck and top deck, the bottom deck being a substantially planar surface and the top deck being substantially non-planar; and
   wherein one of the top and bottom decks further comprise at least a first and second U-shaped portions, each of said at least first and second U-shaped portions defined by a first and second leg separated by a base portion defining a portion of one of the top and bottom deck and the first and second legs are affixed at their free end directly to an inner surface of the respective other of the top and bottom deck to form the spaced apart top and bottom decks.

2. The rotary mower as set forth in claim 1 further comprising the first and second legs of each said U-shaped portions having a different length to provide the top deck of the main body of the mower with a slope relative to the substantially planar bottom deck.

3. A rotary mower deck for a mowing vehicle comprising:
   a main body having a spaced apart upper deck and lower deck supporting at least a rotary culling blade beneath the main body;
   the lower deck being substantially planar and having a top surface supporting the upper deck;
   the upper deck having a plurality of adjacent U-shaped panels connected to the top surface of the lower deck by a first and second legs of each U-shaped panel, the first and second legs of each panel being separated by and depending from a middle portion of the U-shaped panel.

4. The rotary mower deck for a mowing vehicle as set forth in claim 3, wherein the first and second legs of at least a first U-shaped panel are of different lengths to provide a slope to the upper deck of the main body for shedding material and cutting debris off the rotary mower deck.

5. The rotary mower deck for a mowing vehicle as set forth in claim 4, wherein a longer of the different length first and second legs of the first U-shaped deck panel are joined to an adjacent equal length leg of a second U-shaped panel to form the upper deck having the slope extending downwards from a center portion of the upper deck to an outermost edge of the main body to reduce the moment of inertia of the main body about an axis of rotation.

6. The rotary mower deck for a mowing vehicle as set forth in claim 4, wherein a longer of the different length first and second legs of a pair of side U-shaped deck panels are joined to a respective adjacent one of opposing equal length legs of a center U-shaped panel to form the upper deck having the slope extending downwards from the center U-shaped panel to opposing outermost edges of the main body to reduce the moment of inertia of the main body about an axis of rotation.

7. The rotary mower deck for a mowing vehicle as set forth in claim 6, further comprising a drive shaft rotatably connected to the cutting blade and extending through the center U-shaped panel of the spaced apart upper and lower decks to connect with a culling blade driving apparatus.

8. A rotary mower deck for a mowing vehicle comprising:
   a box type main body defined by a plurality of lateral walls joining spaced apart first and second decks to form a plurality of adjacent box sections;
   a rotary cutting blade suspended below the main body and a drive shaft of the rotary cutting blade extending through said main body to connect with a cutting blade driving apparatus;
   the first deck being substantially planar and connected with the second deck via the lateral wall;
   the second deck comprising a plurality of U-shaped deck sections joined at least to a respective adjacent U-shaped deck section; and
   wherein the lateral walls of the main body are defined by a first and second legs separated by and depending from middle portions of the U-shaped deck sections arid the first and second legs of each U-shaped deck section having ends affixed to the first deck.

9. The rotary mower deck for a mowing vehicle as set forth in claim 8, wherein the first and second legs of at least one of the plurality of U-shaped deck sections am of different lengths to provide a sloping top surface to the main body for shedding material and cutting debris off the rotary mower deck.

10. The rotary mower deck for a mowing vehicle as set forth in claim 9, wherein a longer of the different length first and second legs of a first and second side U-shaped deck sections are joined to opposing equal length legs of a center U-shaped section to form the second deck and define the sloping top surface of the main body extending downwards from a center portion of the upper deck to an outermost edge of the main body for shedding material and cutting debris off the rotary mower deck and reducing the moment of inertia of the main body.

11. The rotary mower deck for a mowing vehicle as set forth in claim 9, wherein the respective first and second legs of the plurality of second deck sections define at least three parallel spaced ribs extending substantially across the main body and rigidly connecting the first and second deck sections to form the main body.

12. The rotary mower deck for a mowing vehicle as set forth in claim 9, wherein the first and second legs and the middle portion of each U-shaped sections are contiguous and formed from a single piece of material.

* * * * *